US007658332B1

(12) United States Patent
Adams

(10) Patent No.: US 7,658,332 B1
(45) Date of Patent: Feb. 9, 2010

(54) PROTECTIVE OVERLAY FOR A TRANSACTION CARD

(76) Inventor: Anthony David Adams, 910 High St. #1, Madison, WI (US) 53715

( * ) Notice: Subject to any disclaimer, the term of this patent is extended or adjusted under 35 U.S.C. 154(b) by 259 days.

(21) Appl. No.: 11/733,290

(22) Filed: Apr. 10, 2007

Related U.S. Application Data

(60) Provisional application No. 60/790,693, filed on Apr. 10, 2006.

(51) Int. Cl.
*G06K 19/02* (2006.01)
(52) U.S. Cl. .................................. 235/488; 283/904
(58) Field of Classification Search .................. 235/488
See application file for complete search history.

(56) References Cited

U.S. PATENT DOCUMENTS

| | | | |
|---|---|---|---|
| 2,170,147 A * | 8/1939 | Lane ........................... | 206/447 |
| 2,731,966 A | 1/1956 | Neilsen | |
| 4,429,217 A * | 1/1984 | Hill et al. ..................... | 235/380 |
| 5,746,451 A | 5/1998 | Weyer | |
| 5,856,661 A | 1/1999 | Finkelstein et al. | |
| 6,349,829 B1 * | 2/2002 | Matheis et al. ............... | 206/449 |
| 6,457,649 B1 * | 10/2002 | Hileman ....................... | 235/486 |
| 6,581,839 B1 | 6/2003 | Lasch et al. | |
| 6,896,022 B2 | 5/2005 | Galles et al. | |
| 2003/0004889 A1 * | 1/2003 | Fiala et al. .................... | 705/64 |
| 2004/0118724 A1 * | 6/2004 | Leventhal et al. ............ | 206/352 |
| 2005/0279825 A1 * | 12/2005 | Ashby et al. ................. | 235/380 |
| 2006/0196948 A1 * | 9/2006 | Weber et al. ................. | 235/487 |
| 2007/0063021 A1 * | 3/2007 | Chakiris et al. .............. | 235/380 |

* cited by examiner

*Primary Examiner*—Michael G Lee
*Assistant Examiner*—David Tardif
(74) *Attorney, Agent, or Firm*—Craig A. Fieschko, Esq.; DeWitt Ross & Stevens S.C.

(57) ABSTRACT

An overlay is provided which can be adhered over the front and/or rear faces of a transaction card (e.g., a credit card) to protect it from wear, and also to lend it a personalized appearance. The overlay is preferably defined by transparent film having window portions that may be situated over important card indicia (such as card numbers, signature panels, and the like), and printed portions that may rest over and maskless critical regions of the transaction card, and which may bear images and/or text for personalizing the transaction card. The overlay is preferably provided with an adhesive rear face and a peelable backing so that a cardholder may peel the overlay from the backing and apply it to a transaction card.

20 Claims, 3 Drawing Sheets

US 7,658,332 B1

PROTECTIVE OVERLAY FOR A TRANSACTION CARD

CROSS-REFERENCE TO RELATED APPLICATIONS

This application claims priority under 35 USC §119(e) to U.S. Provisional Patent Application 60/790,693 filed 10 Apr. 2006, the entirety of which is incorporated by reference herein.

FIELD OF THE INVENTION

This document concerns an invention relating generally to transaction cards, i.e., credit cards (including both widely-accepted credit cards such as VISA, MASTERCARD, AMERICAN EXPRESS, DISCOVER, as well as store/retailer credit cards), debit cards, ATM (Automatic Teller Machine) cards, "preloaded value" cards such as cash and gift cards, loyalty cards (e.g., cards used by retailers to identify certain purchasers and reward their purchases), discount cards (e.g., cards used by members of discount programs), identification cards (including security passcards, library cards, etc.), and so forth. More specifically, the invention relates to enhancing the durability of such transaction cards, as well as customization of their appearance.

BACKGROUND OF THE INVENTION

Transaction cards are being more commonly and frequently used as paperless transactions (e.g., electronic money transactions) grow in popularity. As an example, while consumers formerly used credit cards only for large transactions and otherwise used cash for most purchases, consumers now make extensive use of credit and debit cards for "microtransactions"—transactions amounting to only a few dollars, or in some cases for less than a dollar. This shift to use of transaction cards as a primary payment mode is owing to several reasons, including convenience (e.g., avoidance of the need to carry or replenish cash, and the ability to obtain a consolidated statement of spending from the card issuer), security (since the cardholder may have limited liability for spending made on a lost or stolen card), and the ability to obtain rebates or other incentives for use of the transaction cards.

However, when a transaction card is extensively used, it can rapidly wear as the card undergoes frequent "swipes" through card-reading slots and similar machinery used to read data encoded in the card. As examples, a magnetic strip on a transaction card can become worn and difficult to read; signature panels on transaction cards can scrape off, obliterating cardholder signatures and/or other data (e.g., card security codes); and the embossed card number, cardholder name, and/or car expiration dates can erode and become difficult to read. These defects can then lead to difficult or refused transactions.

Additionally, transaction cards tend to have a somewhat standard and bland appearance, and as cardholders increase their use of transaction cards, they often wish to have greater personalization of their cards. Most transaction card issuers provide only a single card design, or otherwise offer a limited selection of card designs from which a cardholder may choose. The usual designs tend to heavily feature the brand of the card issuer, but cardholders usually have little affinity to this brand, and were attracted only to the card issuer owing to some functional feature of the transaction card such as interest rates, incentives, and so forth.

The desire to customize transaction cards is also strong in the field of preloaded value cards. Purchasers often load these with funds, and then give them as a gift to a recipient/cardholder. While such preloaded value cards are becoming increasingly popular as gifts, many gift-givers still avoid them because they seem impersonal. While they are often sold with envelopes and/or greeting cards into which purchasers may inscribe some message to the recipient/cardholder, the ability to personalize the appearance of these preloaded value cards might substantially increase their acceptance.

SUMMARY OF THE INVENTION

The invention, which is intended to at least partially address some of the aforementioned problems, involves a protective overlay for a transaction card, as well as transaction cards bearing such overlays and methods for generating and applying such overlays. To give the reader a basic understanding of some of the advantageous features of the invention, following is a brief summary of preferred forms in which the invention might be provided, with reference being made to the accompanying drawings to enhance the reader's understanding. Since this is merely a summary, it should be understood that more details regarding preferred versions of the invention may be found in the Detailed Description set forth elsewhere in this document. The claims set forth at the end of this document then define the various versions of the invention in which exclusive rights are secured.

Referring to the accompanying drawings (and particularly to the accompanying FIG. 1), an exemplary transaction card 10 is illustrated, and includes a first card face 12 which bears embossed indicia 14 (e.g., a raised cardholder name, card issuance and expiration dates, and card number), and an opposing second card face 16 bearing a signature panel 18 having a cardholder signature printed thereon. FIGS. 1-3 then illustrate different exemplary versions of a protective overlay 100/200/300 for the transaction card 10. Each overlay 100/200/300 includes a sheet of material having a visible overlay face 102/202/302 for display atop the transaction card 10, an opposing rear overlay face 104/204 to be adhered to the transaction card 10 (not shown in FIG. 3), and one or more window portions 106/206/306 and printed portions 108/208/308 between the visible overlay face 102/202/302 and the rear overlay face 104/204. Each printed portion 108/208/308 is at least partially opaque, whereby any portion of a transaction card 10 beneath is at least partially masked by the printed portion 108/208/308. Thus, the printed portion 108/208/308 of the overlay 100/200/300 may bear printed indicia (e.g., alphanumeric characters or other symbols), images, or other matter to be displayed to handlers of the transaction card 10 after the protective overlay 100/200/300 is applied to the transaction card 10.

Each window portion 106/206/306 is then at least substantially transparent, whereby any portion of a transaction card 10 situated beneath the window portion 106/206/306 may be viewed through the window portion 106/206/306 by personnel handling the transaction card 10. As particularly shown in FIG. 1, the embossed indicia 14 of the transaction card 10 preferably have a window portion 106/206/306 of the overlay 100/200/300 adhered over the indicia 14 so that the indicia 14 are better protected from wear. The window portion 106/206/306 of the overlay 100/200/300 is preferably sufficiently flexible that it may plastically conform about the embossed indicia 14 beneath so that the texture of the embossed indicia 14 is maintained through the overlay 100/200/300, while the remainder of the overlay 100/200/300 may be adhered in coplanar abutment with the transaction card 10.

Preferably, each window portion 106/206/306 bears adhesive on the rear overlay face 104/204, whereby each window portion 106/206/306 may be adhered to a portion of a transaction card 10. However, the printed portions 108/208/308 could also or alternatively bear adhesive on their rear overlay faces 104/204. Most preferably, adhesive is uniformly applied across the entirety of the rear overlay face 104/204 of the overlay 100/200/300 to adhesively back both window portions 106/206/306 and printed portions 108/208/308 of the overlay 100/200/300. As best seen in FIG. 1, when the window portions 106 and the printed portions 108 of the overlay 100 are adhered to the transaction card 10, they preferably have their rear overlay faces 104 adhered to at least substantially the entire first card face 12, so that all of (or substantially all of) the entire first card face 12 is protectively covered by the overlay 100. As also seen in FIG. 1, the entire second card face 16 may be similarly covered by the overlay 100, though in this case a second window portion 106*b* is preferably provided to allow readability of any cardholder signature provided on the signature panel 18. The overlay 100 may protectively cover any magnetically-encoded strip 20 on the transaction card 10 (or readable chip or other data storage medium), so long as the overlay 100 allows data transmission through its thickness.

FIGS. 1 and 2 illustrate versions of the overlay 100/200 which are folded over the transaction card 10, with the rear overlay face 104/204 of the overlay 100/200 being adhered to both the first card face 12 and the second card face 16, and with the window portions 106*b* and 206 being situated over the signature panel 18 with their rear overlay faces 104/204 adhered to the signature panel 18. However, FIG. 3 illustrates a variation from this arrangement, wherein the overlay 300 is sized and configured to fit over only the first card face 12 of the transaction card 10. Further, whereas the versions of the overlay 100/300 depicted in FIGS. 1 and 3 cover all (or substantially all) of the first and/or second card face 16 of the transaction card 10, FIG. 2 illustrates a variation wherein the overlay 200 is configured to cover only a portion of the first card face 12 of the transaction card 10, leaving another portion uncovered (e.g., a portion bearing the embossed indicia 14 and/or a security hologram 22 or other optically-encoded data).

As best depicted in FIGS. 2 and 3, the overlay 200/300 is preferably provided to a cardholder on a backing sheet 210/310 to which the rear overlay face 204/304 is peelably adhered, so that the cardholder may peel the overlay 200/300 from the backing sheet 210/310 to expose the rear overlay face 204 and then adhere the rear overlay face 204 to the transaction card 10. The area of the backing sheet 210/310 is preferably greater than the area of the overlay 200/300 so that the backing sheet 210/310 includes at least one protruding portion which extends outwardly from and adjacent to at least a portion of the perimeter of the overlay 200/300. In FIGS. 2 and 3, two protruding portions 212*a*/312*a* and 212*b*/312*b* are depicted, with the first protruding portion bearing one or more apertures 214/314 spaced from the perimeter of the backing sheet 210/310, and the second protruding portion bearing one or more notches 216/316 extending inwardly from the perimeter of the backing sheet 210/310. These structures allow for easy retail display of multiple overlays 200/300, with the apertures 214/314 allowing overlays 200/300 to be hung for display on an elongated display peg, not shown (with the display peg being received within the apertures 214/314 of the backing sheets 210/310). The notches 216/316 similarly allow overlays 200/300 to be mounted on one or more rails (not shown), with the overlays 200/300 being supported by each other above the rails so that potential purchasers may readily index through the collected overlays 200/300. Each notch 216/316 preferably diverges as it extends inwardly from the perimeter of the backing sheet 210/310, i.e., at least a portion of each notch 216/316 expands in size as the notch 216/316 extends inwardly, so that a rail is removably held within the notch 216/316 once inserted therein.

The overlay 100/200/300 is preferably formed of thin flexible sheet material, preferably a plastic film such as vinyl, polyester, or polyvinyl chloride having a thickness of 5 mil (5 thousandths of an inch) or less, and most preferably 2 mil or less. The overlay 100/200/300 is also preferably formed of materials which do not interfere with the electromagnetic transmission of data from magnetic strips, RFID (Radio Frequency Identification) chips, or other data carriers situated on or within the transaction card 10. Where optically-encoded data is provided on the card (e.g., barcodes, matrix codes, data-encoded mosaics, holograms, and the like), any window portions 106/206/306 situated thereover preferably do not interfere with optical reading of the data.

Overlays 100/200/300 may be prepared by conventional printing processes, e.g., via four-color screen printing of the printed portions 108/208/308 of the overlay 100/200/300 onto a transparent adhesively-backed film, with die-cutting cutting through the film and the backing sheet 210/310 to define the borders of the backing sheet 210/310 (including any desired apertures 214/314 and notches 216/316), and also cutting through the film to define the borders of the overlay 100/200/300 itself so that the overlay 100/200/300 may be peeled from the backing sheet 210/310. Portions of the film surrounding the overlay 100/200/300 may then be left unused on the backing sheet 210/310 (though they may, and preferably do, bear printing), and these may be discarded. The window portions 106/206/306 may be left wholly or partially unprinted to define areas through which portions of the transaction card 10 may be viewed.

A preferred method for generating the overlays 100/200/300 involves printing single or multiple copies on demand using laser printing, inkjet printing, or other printing processes which are well adapted for printing of limited quantities of items, rather than via bulk print runs using offset and similar printing processes. Here, a cardholder may be provided with a template for the overlay 100/200/300 (more particularly, for the visible overlay face 102/202/302 and any adjacent protruding portions 212*a*/312*a* and/or 212*b*/312*b*) on a computer display screen, and may be allowed to select and place images, and indicia such as text strings, on the template as desired. A blank which includes the overlay 100/200/300 and backing sheet 110/210/310 may then be provided to a printer (e.g., a laser printer, inkjet printer, or other printer) in communication with the computer. The cardholder may then direct the computer and printer to print the template onto the blank to generate the finished overlay 100/200/300. Usefully, this production process may be provided online, as by presenting the template on a website which may be accessed by a cardholder who wishes to generate a desired overlay 100/200/300. In this case, the cardholder might upload desired images and/or text to the website for placement on the template to generate a customized overlay 100/200/300, and/or the cardholder might select from stock images and/or text which are provided for selection on the website for ready use. After placing the desired images and/or text on the template as desired, the cardholder might specify to the website that the template is complete and that one or more overlays 100/200/300 should be printed by the website's provider, and delivered to the cardholder for subsequent use. Thus, cardholders may access the website to generate and/or order overlays 100/200/300 which are customized by the cardholders, or which have already been designed by the website's provider, or by other cardholders.

Further advantages, features, and objects of the invention will be apparent from the remainder of this document in conjunction with the associated drawings.

DETAILED DESCRIPTION OF PREFERRED VERSIONS OF THE INVENTION

Figure 1:
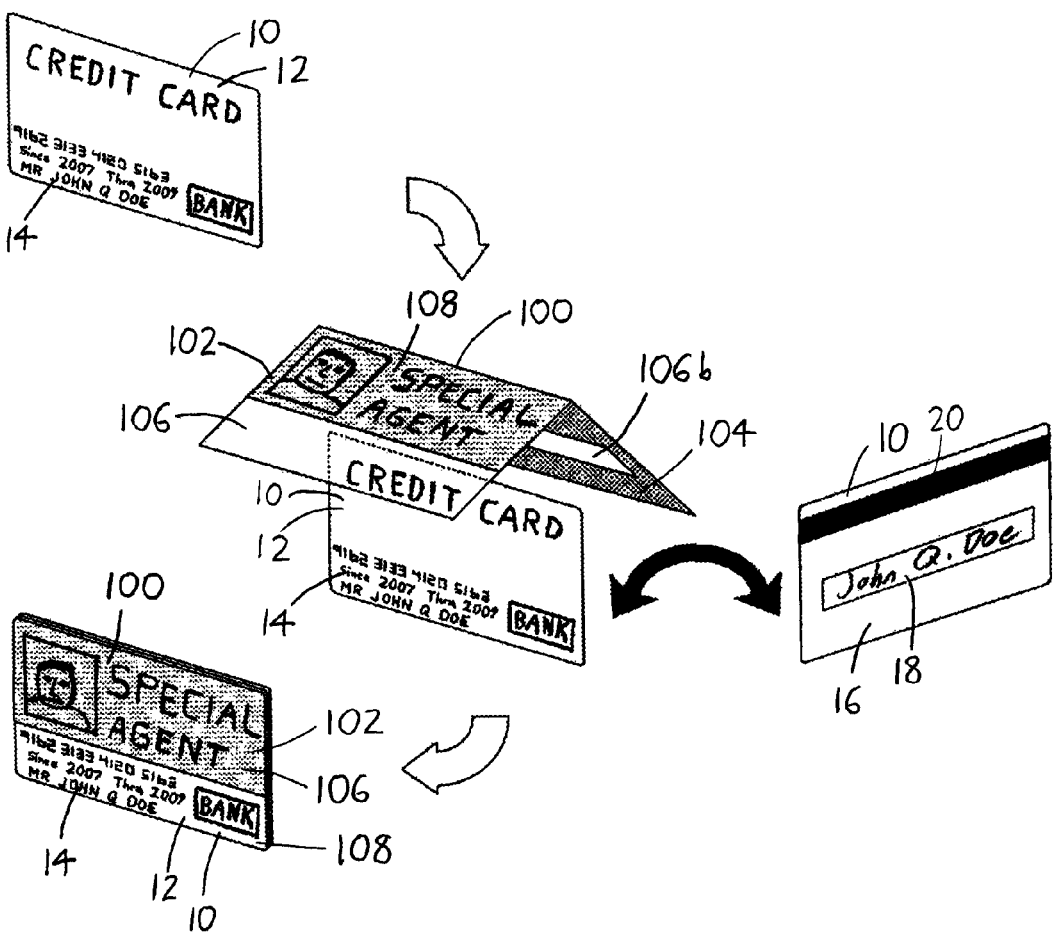
FIG. 1 schematically illustrates the application of an overlay 100 to a transaction card 10 by adhering its rear overlay face 104 to the first and second card faces 12 and 16 of the transaction card 10, with the embossed indicia 14 of the transaction card 10 being visible through a first window portion 106 of the overlay 100 and the signature panel 18 of the transaction card 10 being visible through a second window portion 106b of the overlay 100, and the remainder of the transaction card 10 being wholly or partially masked by the printed portions 108 of the overlay 100.
Figure 2:
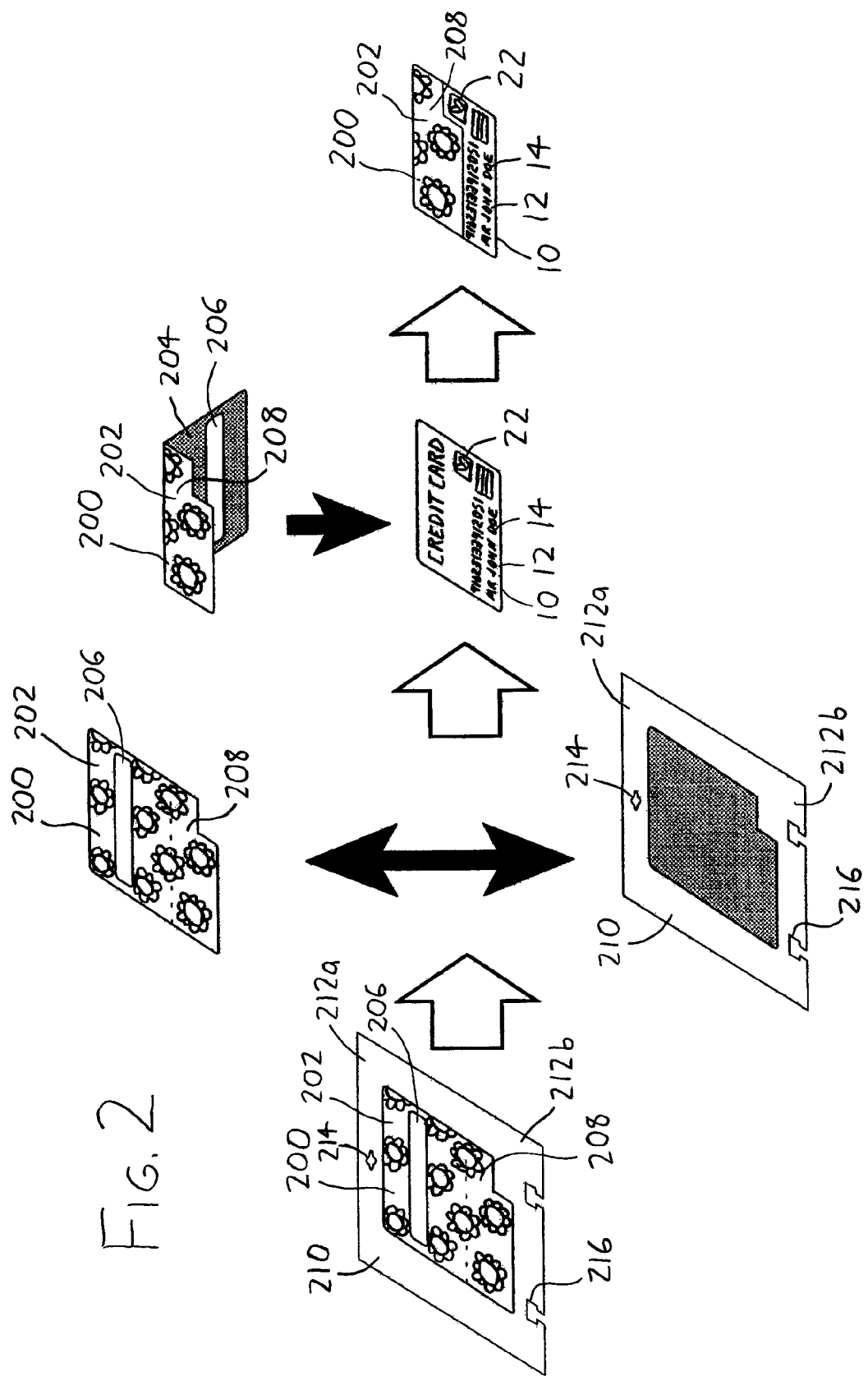
FIG. 2 schematically illustrates the application of an overlay 200 to a transaction card 10 by peeling the overlay 200 from a backing sheet 210 and adhering its rear overlay face 204 to a portion of the first card face 12 and to the entirety of the second card face 16, with the signature panel 18 of the transaction card 10 being visible through a window portion 206 and the remainder of the transaction card 10 being wholly or partially masked by the printed portion 208 of the overlay 200.
Figure 3:
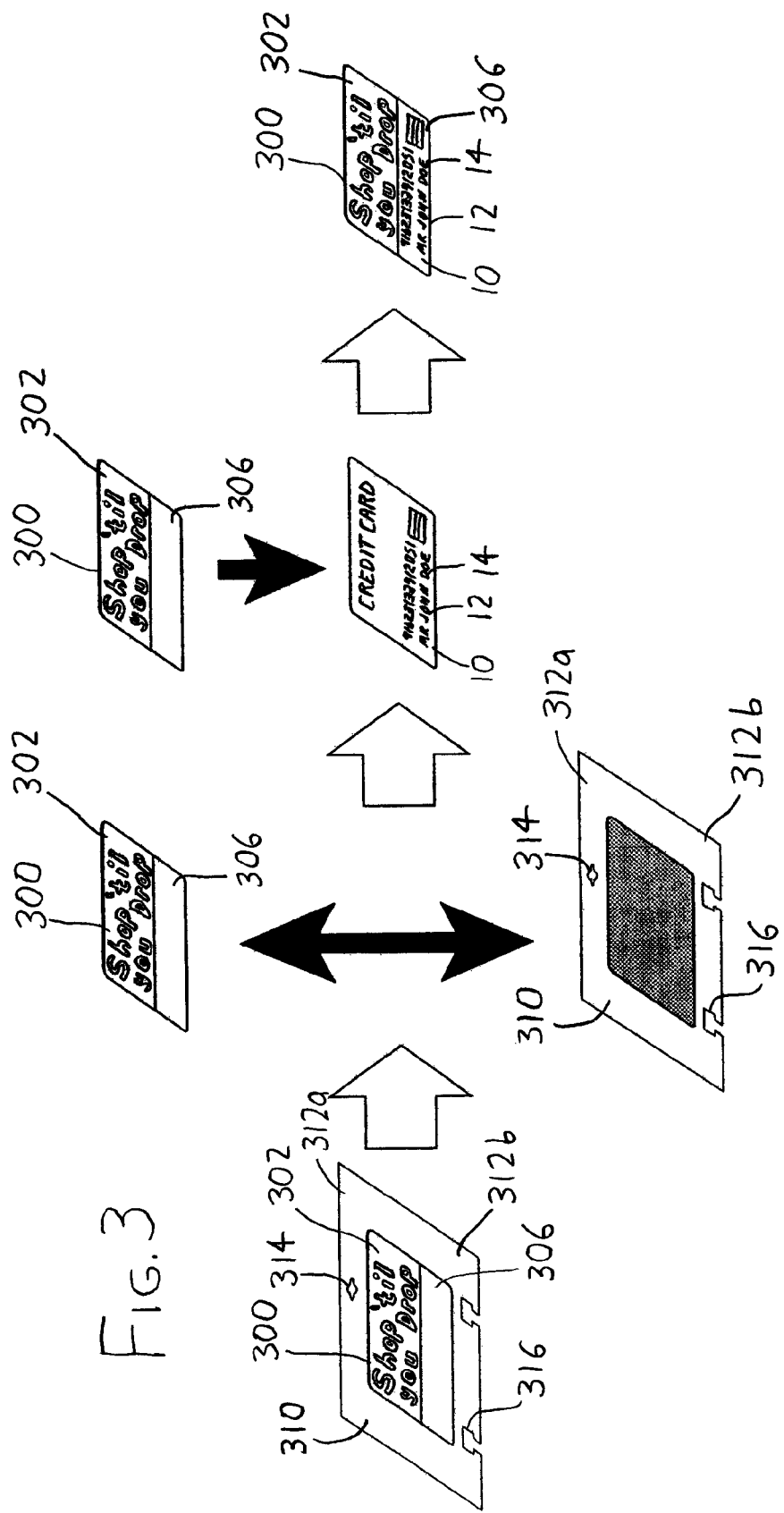
FIG. 3 schematically illustrates the application of an overlay 300 to a transaction card 10 by peeling the overlay 300 from a backing sheet 310 and adhering its rear overlay face (not shown) to the first card face 12, with the embossed indicia 14 of the transaction card 10 being visible through a window portion 306 and the remainder of the transaction card 10 being wholly or partially masked by the printed portion 308 of the overlay 300.

Expanding on the discussion above, it should be understood from a comparison of FIGS. 1-3 that overlays 100/200/300, as well as their backing sheets/blanks 210/310, may assume a variety of different forms. Overlays 100/200/300 may coverall or only portion of a first card face 12 and/or second card face 16, and could even wrap around a card 10 to cover one or more faces 12 and/or 16 more than once; may have rectangular or nonrectangular boundaries, including highly irregular boundaries (e.g., boundaries with portions which indent inwardly or protrude outwardly, and/or fringed, scalloped, or ragged boundaries); and may include protruding portions, e.g., tabs or rings which extend outwardly from their boundaries, and which are intended to extend beyond the bounds of any transaction card 10 to which the overlay 100/200/300 is adhered.

The printed portions 108/208/308 of the overlays 100/200/300 can include any images and/or indicia capable of being printed onto the overlays, with the printed portions 108/208/308 shown in FIGS. 1-3 merely being simple examples. FIG. 1 illustrates a printed portion 108 bearing the cardholder's image, along with indicia intended to humorously simulate an identification card. FIG. 2 illustrates a printed portion 208 wherein a repeating floral pattern is reproduced across the entirety of the printed portion 208. FIG. 3 then illustrates a printed portion 308 which bears a humorous slogan. It should be understood that printed portions bearing considerably richer content are possible, including text in a variety of fonts, photographic and artistic images, varying backgrounds and colors, and optical features such as varying reflectivity, translucency, iridescence, and so forth. As noted previously, a provider of the overlays 100/200/300 might allow cardholders to design the printed portions 108/208/308 of the overlays 100/200/300 ordered by the cardholders (as well as designing the size/shape of the borders of the overlays 100/200/300 and the layout/placement of the window portions 106/206/306), and/or the provider might allow cardholders to simply choose from a variety of stock overlay designs, or elements to be included on overlay designs (e.g., flags, historical images, images of celebrities, common slogans, etc.).

Overlays 100/200/300 may include one or more window portions 106/206/306 situated as desired, including being situated on one or more boundaries of an overlay 100/200/300, as in FIGS. 1 and 3, or spaced inwardly therefrom, as in FIG. 2. Window portions 106/206/306 can be wholly translucent, or could be tinted for decorative or other purposes. As previously noted, any window portion 106/206/306 of an overlay 100/200/300 which is intended to rest over embossed indicia 14 on a transaction card is preferably sufficiently flexible that it may plastically conform to the embossed indicia 14, so that the embossed indicia 14 maintain their definition/texture through the overlay 100/200/300. If the material of the overlay 100/200/300 is sufficiently plastic, this can be done (for example) by installing the overlay 100/200/300 atop a transaction card 10 and then tracing the outlines of the embossed indicia 14 with a pencil or the like to plastically deform the window portion 106/206/306 thereover, so the window portion 106/206/306 is bent to conform to the indicia in a form-fitting fashion. As another alternative, the overlay 100/200/300 may be stamped during production so that the window portion 106/206/306 to rest over the embossed indicia 14 is defined as a slightly raised "bubble." Any portion of the bubble that does not have the indicia 14 resting directly beneath may be pressed down with a pencil tip or the like so that the overlay 100/200/300 is form-fit over the indicia 14.

Rather than forming the window portions 106/206/306 as transparent windows, they could instead be defined as apertures in an overlay 100/200/300. However, transparent windows are preferred to better protect the transaction card 10, and also to enhance the durability of the overlay 100/200/300, which may more rapidly experience tearing or other wear when apertures are defined therein.

The overlay 100/200/300 can be formed of materials apart from or in addition to transparent films, e.g., paper/cellulosic materials, metallic foils, and so forth, as well as combinations of any of the aforementioned materials. Multi-layer overlays 100/200/300 are also possible, e.g., metallic foil defined as a layer over a transparent film substrate, with the transparent film defining the window portions 106/206/306 of the overlay 100/200/300 and the foil defining the printed portions 108/208/308. Further, the overlay 100/200/300 need not be flexible, and could be rigid.

Regarding the adhesive provided on the overlay 100/200/300, this is preferably an adhesive which is ready to use upon being peeled from the backing sheet 210/310, e.g., an adhesive gum, or a surface which clings to a transaction card 10 via electrostatic cling, surface chemistry effects, or other action. Where overlays 100/200/300 are provided without backing sheets 210/310, any adhesive provided on the rear overlay face 104/204 might require activation by the cardholder prior to being applied to a transaction card 10, as by dampening it with water or another solvent to activate the adhesive prior to application. The strength of an overlay 100/200/300 relative to the strength of its adhesive is preferably such that any overlay 100/200/300 adhered to a transaction card 10 will be securely held thereon, but wherein the adhesive can be defeated to peel the overlay 100/200/300 from the transaction card 10 without tearing the overlay 100/200/300. As a result, if a cardholder wishes to remove an overlay 100/200/300 from his/her transaction card 10 and reapply a new one, this may be readily accomplished.

While the backing sheet 210/310 is preferably formed of some inexpensive substrate such as paper or cardboard which is appropriately surfaced such that any adhesively-backed overlay 100/200/300 can readily peeled therefrom, the backing sheet 210/310 may be formed of other materials as well. While not depicted in FIGS. 2-3, it is generally anticipated that the printing of the printed portions 208/308 of the overlay 200/300 may continue onto the surrounding portions 212a/312a and 212b/312b of the backing sheet 210/310, and that these surrounding portions 212a/312a and 212b/312b may additionally include information such as instructions for use, manufacturer and pricing information, etc. The apertures 214/314 allow backing sheets 210/310 to be hung from a hook or a display peg, whereas the notches 216/316 allow backing sheets 210/310 to be hung on horizontal or circular rails so that consumers may index through them for review (see, e.g., U.S. Pat. No. 2,731,966).

The invention can also incorporate features discussed in the prior patents discussed earlier in this document, and the entireties of these patents should be regarded as incorporated by reference in this document (i.e., their contents should be considered to constitute part of this document, though their contents are not physically included for sake of brevity and economy).

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A protective overlay in combination with a transaction card, wherein:
   I. the transaction card has:
      a. a first card face bearing embossed indicia thereon, and
      b. an opposing second card face bearing a signature panel having a signature printed thereon,
   II. the overlay includes a sheet of material having a visible overlay face for display, an opposing rear overlay face, and a first window portion, a second window portion, and a printed portion between the visible overlay face and the rear overlay face, wherein:
      a. the first window portion:
         (1) has adhesive on the rear overlay face, with the first window portion being adhered to a portion of a transaction card at the embossed indicia, and
         (2) is at least substantially transparent, whereby the portion of the transaction card beneath is viewable through the first window portion;
      b. the second window portion:
         (1) is at least substantially transparent, and
         (2) bears adhesive on the rear overlay face,
         with the overlay being folded over the transaction card to situate the second window portion over the signature panel, with the rear overlay face of the second window portion adhered to the signature panel;
      c. the printed portion is at least partially opaque, whereby the portion of the transaction card beneath is at least partially masked.

2. The combination of claim 1 wherein the overlay has a thickness, between its adhesive face and its opposing visible overlay face, of 5 mil or less.

3. The combination of claim 1 wherein the overlay has a thickness, between its adhesive face and its opposing visible overlay face, of 2 mil or less.

4. The combination of claim 1 wherein both the window portion and the printed portion of the overlay are adhered to at least substantially the entire first card face at the rear overlay face, whereby at least substantially the entire first card face is protectively covered by the overlay.

5. The combination of claim 1 wherein:
   a. the window portion of the overlay is flexibly bent to curve about the embossed indicia beneath, and
   b. the printed portion of the overlay is adhered in coplanar abutment with the transaction card.

6. A protective overlay for a transaction card, the overlay including:
   a. a sheet of material having a visible overlay face for display, an opposing rear overlay face, and both a window portion and a printed portion between the visible overlay face and the rear overlay face, wherein:
      (1) the window portion:
         i. has adhesive on the rear overlay face, whereby the window portion may be adhered to a portion of a transaction card, and
         ii. is at least substantially transparent, whereby any portion of a transaction card beneath may be viewed through the window portion; and
      (2) the printed portion is at least partially opaque, whereby any portion of a transaction card beneath is at least partially masked;
   b. a backing sheet to which the rear overlay face is peelably adhered, wherein:
      (1) the area of the backing sheet is greater than the area of the overlay, whereby the backing sheet includes at least one protruding portion which extends outwardly from and adjacent to at least a portion of the perimeter of the overlay;
      (2) the protruding portion of the backing sheet includes a notch therein, the notch extending inwardly from the perimeter of the backing sheet, wherein at least a portion of the notch expands in size as the notch extends inwardly from the perimeter of the backing sheet.

7. The overlay of claim 6 wherein the overlay has a thickness, between its adhesive face and its opposing visible overlay face, of 5 mil or less.

8. The overlay of claim 6 wherein the overlay has a thickness, between its adhesive face and its opposing visible overlay face, of 2 mil or less.

9. A protective overlay for a transaction card, the overlay including:
   I. a sheet of material having a visible overlay face for display, an opposing rear overlay face, and both a window portion and a printed portion between the visible overlay face and the rear overlay face, wherein:
      a. the window portion:
         (1) has adhesive on the rear overlay face, whereby the window portion may be adhered to a portion of a transaction card, and
         (2) is at least substantially transparent, whereby any portion of a transaction card beneath may be viewed through the window portion; and
      b. the printed portion is at least partially opaque, whereby any portion of a transaction card beneath is at least partially masked;
   II. a backing sheet to which the rear overlay face is peelably adhered, the area of the backing sheet being greater than the area of the overlay, wherein:
      a. the backing sheet includes:
         (1) a first protruding portion which extends outwardly from and adjacent to a first portion of the perimeter of the overlay;
         (2) a second protruding portion which extends outwardly from and adjacent to a second portion of the perimeter of the overlay, wherein the second portion of the perimeter of the overlay is opposite the first portion of the perimeter of the overlay, with the overlay being situated between the first and second portions of the perimeter of the overlay;
b. the first protruding portion of the backing sheet includes an aperture therein, the aperture being:
(1) defined within the first portion of the perimeter of the overlay, and
(2) spaced from the perimeter of the backing sheet;
c. the second protruding portion of the backing sheet includes a notch therein, the notch:
(1) being defined within the second portion of the perimeter of the overlay, and
(2) extending inwardly from the perimeter of the backing sheet.

10. The overlay of claim 9 wherein the overlay has a thickness, between its adhesive face and its opposing visible overlay face, of 5 mil or less.

11. The overlay of claim 9 wherein the overlay has a thickness, between its adhesive face and its opposing visible overlay face, of 2 mil or less.

12. A protective overlay in combination with a transaction card, wherein:
I. the transaction card has a first card face bearing embossed indicia thereon and an opposing second card face,
II. the overlay includes a sheet of material having a visible overlay face for display, an opposing rear overlay face, and both a window portion and a printed portion between the visible overlay face and the rear overlay face, wherein:
  a. the window portion:
    (1) has adhesive on the rear overlay face, with the window portion being adhered to a portion of a transaction card at the embossed indicia, and
    (2) is at least substantially transparent, whereby the portion of a transaction card beneath is viewable through the window portion; and
  b. the printed portion is at least partially opaque, whereby the portion of a transaction card beneath is at least partially masked;
wherein the overlay is folded over the transaction card, with the overlay's rear overlay face being adhered to both the first card face and the second card face.

13. The combination of claim 12 wherein:
a. the transaction card bears a magnetically encoded strip on one of its first card face and second card face, and
b. a portion of the overlay is adhered over at least a portion of the magnetic strip.

14. The combination of claim 12 wherein the overlay has a thickness, between its adhesive face and its opposing visible overlay face, of 5 mil or less.

15. A process for installing a protective overlay on a transaction card having a first card face bearing embossed indicia thereon and an opposing second card face, the process including the steps of:
a. providing an overlay which includes:
  (1) a visible overlay face,
  (2) an opposing rear overlay face,
  (3) a window portion between the visible overlay face and the rear overlay face, the window portion:
    (a) being at least substantially transparent, and
    (b) bearing adhesive on the rear overlay face;
  (4) a printed portion between the visible overlay face and the rear overlay face, the printed portion being at least partially opaque;
  (5) a backing sheet to which the rear overlay face is peelably adhered, wherein the area of the backing sheet is greater than the area of the overlay, whereby the backing sheet includes at least one protruding portion which extends outwardly from and adjacent to at least a portion of the perimeter of the overlay;
b. peeling the overlay from the backing sheet to expose the rear overlay face;
c. adhering the window portion of the overlay to the embossed indicia of the first card face at the rear overlay face.

16. The process of claim 15:
a. wherein the window portion of the overlay is flexibly bent to curve about the embossed indicia beneath, and
b. further including the step of adhering the printed portion of the overlay in coplanar abutment with the transaction card.

17. The process of claim 15:
a. wherein the second card face bears a signature panel having a signature printed thereon;
b. wherein the overlay includes a second window portion between the visible overlay face and the rear overlay face, the second window portion:
  (1) being at least substantially transparent, and
  (2) bearing adhesive on the rear overlay face;
c. further including the step of folding the overlay over the transaction card to situate and adhere the second window portion over the signature panel.

18. The process of claim 15 further including the following steps prior to the step of peeling the overlay from the backing sheet:
a. providing a template for the visible overlay face on a display screen;
b. placing one or more of:
  (1) an image, and
  (2) a text string,
  on the template;
c. providing a blank to a printer, wherein the blank includes the backing sheet with the rear overlay face peelably adhered thereon;
d. printing the template onto the overlay of the blank.

19. The process of claim 18 wherein:
a. an image is placed on the template;
b. the image is either:
  (1) selected from, or
  (2) uploaded to,
  a website at which the template is provided.

20. The process of claim 15 further including the following steps prior to the step of peeling the overlay from the backing sheet:
a. providing a template for the visible overlay face on a website;
b. allowing one or more of:
  (1) uploading of an image to the website, and
  (2) selection of an image from the website, the image being selected from a number of stock images provided on the website;
c. placing the image on the template;
d. printing the template onto a blank, wherein the blank includes the backing sheet with the rear overlay face peelably adhered thereon, to generate the printed portion of the visible overlay face.

* * * * *